United States Patent
Steele

(10) Patent No.: US 6,604,601 B2
(45) Date of Patent: Aug. 12, 2003

(54) LIFT TRUCK DRIVE TRAIN

(75) Inventor: Frank E. Steele, Wayne, WV (US)

(73) Assignee: Biomet-Ross, Inc., Bellefontaine, OH (US)

( * ) Notice: Subject to any disclaimer, the term of this patent is extended or adjusted under 35 U.S.C. 154(b) by 5 days.

(21) Appl. No.: 10/032,880

(22) Filed: Oct. 22, 2001

(65) Prior Publication Data

US 2003/0075376 A1 Apr. 24, 2003

(51) Int. Cl.[7] .............................................. B60K 17/00
(52) U.S. Cl. ................... 180/307; 180/305; 180/306; 180/308; 180/65.4
(58) Field of Search ................... 180/305, 306, 180/65.4, 307, 308

(56) References Cited

U.S. PATENT DOCUMENTS

| | | | |
|---|---|---|---|
| 3,858,675 A | * | 1/1975 | Geis ........................... 180/306 |
| 3,889,759 A | * | 6/1975 | Larson ........................... 172/3 |
| 3,904,333 A | * | 9/1975 | Stoeckelmann ............. 418/132 |
| 3,918,546 A | * | 11/1975 | Chichester et al. ......... 180/243 |
| 4,108,265 A | * | 8/1978 | Abels ........................... 180/307 |
| 4,236,596 A | | 12/1980 | Abels |
| 4,320,814 A | | 3/1982 | Middelhoven |
| 4,413,698 A | | 11/1983 | Conrad et al. |
| 4,534,169 A | | 8/1985 | Hunt |
| 4,865,152 A | | 9/1989 | Gardner, Jr. |
| 5,158,150 A | | 10/1992 | Askeland et al. |
| 5,203,172 A | | 4/1993 | Simpson et al. |
| 5,230,402 A | | 7/1993 | Clark et al. |
| 5,542,335 A | | 8/1996 | Goodyear |
| 5,642,617 A | * | 7/1997 | Larkin et al. .......... 188/DIG. 1 |
| 5,659,485 A | * | 8/1997 | Lee ............................. 60/487 |
| 5,687,809 A | * | 11/1997 | Braud ........................ 180/292 |
| 5,802,745 A | * | 9/1998 | Haseotes et al. ........... 180/53.7 |

* cited by examiner

Primary Examiner—Brian L. Johnson
Assistant Examiner—Brian L Swenson
(74) Attorney, Agent, or Firm—Frank H. Foster; Kremblas, Foster, Phillips & Pollick

(57) ABSTRACT

A lift truck having a parallel pair of drive trains, each powering a drive wheel on a different side of the lift truck. Each drive train includes a DC electric motor driving a variable displacement, hydraulic pump having a pressure output capacity of at least 3,000 psi. Each hydraulic pump is connected to a hydraulic motor, having a rotational speed capacity of at least 3,000 rpm and is connected through a transmission to the drive wheel on a different side of the lift truck. The DC motor is run continuously at full rpm and the torque/speed ratio of the drive train is controlled by controlling the displacement of the hydraulic pump.

12 Claims, 3 Drawing Sheets

LIFT TRUCK DRIVE TRAIN

BACKGROUND OF THE INVENTION

1. Field of the Invention

This invention relates generally to vehicle power drive trains and more particularly to a DC motor and hydraulic system which enables an electric motor driven lift truck to have both sufficient torque to climb grades and sufficient speed on both grades and horizontal surfaces to make it practical.

2. Description of the Related Art

Lift trucks, sometimes referred to as forklifts, have long been recognized as having a high utility for transporting merchandise and industrial equipment. They are typically propelled by internal combustion engines or electric motors, most commonly DC electric motors, powered by storage batteries. FIG. 1 illustrates a lift truck.

Lift trucks driven by DC electric motors typically have electrical control systems which vary the voltage applied to the DC motor and in that manner, control the speed at which the lift truck is propelled. A block diagram of a drive system for a typical lift truck driven by a DC motor is illustrated in FIG. 2. Although DC motor driven lift trucks have a transmission for providing a desirable torque/speed ratio between the DC motor and the driven wheels of the lift truck, typically such transmissions do not have a plurality of selectable gear ratios. Instead, speed is ordinarily controlled only by controlling the rotational speed of the DC motor by varying the voltage applied to it.

Lift trucks powered by internal combustion engines utilize a conventional engine throttling system to control engine speed and therefore vehicle speed, but also have mechanical transmissions followed by drive links to the wheels for selecting major step changes in gear ratios between the engine and the wheels. Such a prior art lift truck drive system is illustrated in FIG. 3. There may, of course, be additional components interposed in the drive train of both types of conventional lift truck drive systems as it extends from the power plant to the driven wheels.

Prior art lift trucks also have utilized hydraulic pump and hydraulic motor systems. Commonly, an internal combustion engine drives a hydraulic pump, which applies hydraulic fluid under pressure to one or more hydraulic motors, typically an individual hydraulic motor for each wheel. Such systems are provided with hydraulic controls for varying the flow rate and/or pressure to each hydraulic motor for controlling the speed of the vehicle and, in some instances, for controlling steering.

Electric lift trucks have the desirable characteristic that they do not emit noxious fumes and pollutants. However, they suffer from the disadvantage that they do not have as much power output as the internal combustion engine systems. The consequence is that electric lift trucks cannot be used in a work environment where they must travel up ramps, hills or other grades. Electric lift trucks have been unable to continuously climb a grade, but instead can go only as far as their momentum can carry them. In those lift truck applications which require the ability to travel up a grade, the internal combustion engine systems are necessary, but the pollutant emissions can be a problem. An engineering consultant has observed that it was not possible to build a commercially practical and acceptable electric driven lift truck which had both sufficient torque to accommodate the load demands of travelling up a grade of a magnitude typically encountered by lift trucks and yet also had sufficient grade and horizontal surface speed performance to be acceptable to customers.

It is therefore an object and feature of the invention to provide a DC motor driven lift truck, which is not only economically competitive with other lift trucks, but also capable of operating characteristics which include both a sufficient torque to climb typical industrial grades and sufficient speed to allow practical use.

A further object and feature of the invention is to provide an electric lift truck which does not require the costly DC motor speed controls which control motor voltage, draws less current from the batteries than conventional electric lift trucks so that the batteries last longer before recharging is required, and requires less maintenance costs than conventional DC motor systems.

Yet a further object and feature of the invention is to provide a DC motor driven lift truck, which not only exhibits the above characteristics, but additionally provides a very broad range of torque/speed drive ratios between the electric motor and the driven wheels of the lift truck.

BRIEF SUMMARY OF THE INVENTION

The lift truck of the invention has a power drive train, including the combination of: an electric motor which is preferably operated continuously at full voltage, a displacement hydraulic pump driven by the electric motor and having a pressure output capacity of at least 3,000 psi; a displacement hydraulic motor hydraulically connected to the pump and having a rotational speed capacity of at least 3,000 rpm; and a hydraulic fluid volumetric flow rate control connected in the hydraulic system for controllably varying the torque and speed of the hydraulic motor.

Figure 1:
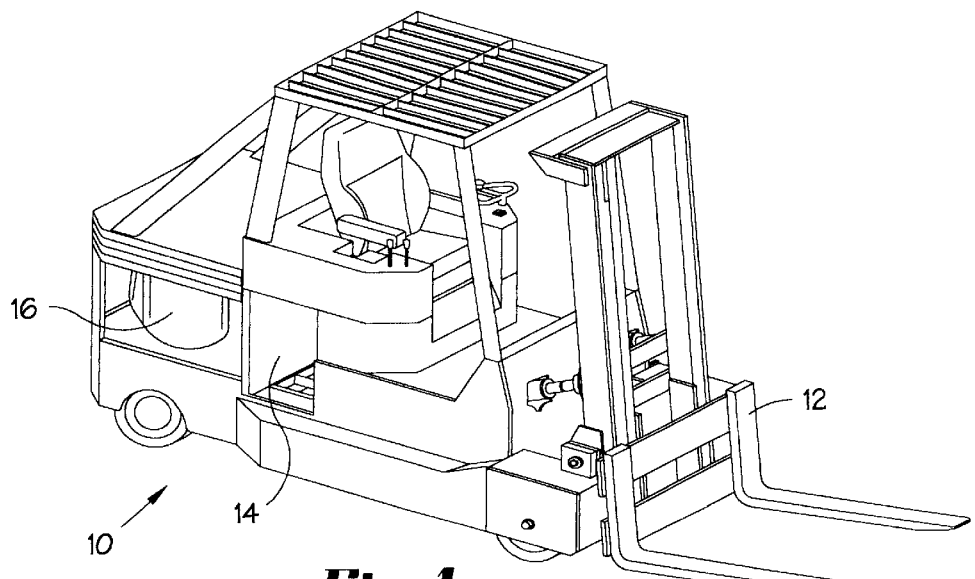
FIG. 1 is a view in perspective of a lift truck.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE INVENTION

FIG. 1 illustrates the conventional structure of a lift truck 10, having a front lift 12 and a battery storage compartment 14. The lift truck of the present invention is conventional in appearance, but, in the preferred embodiment, is provided with a pair of 20 horsepower DC electric motors 16. The electric motors 16 power the hydraulic system of the present invention and additionally power hydraulic pumps for the conventional hydraulic systems which position the lift and control vehicle steering.

Figure 4:
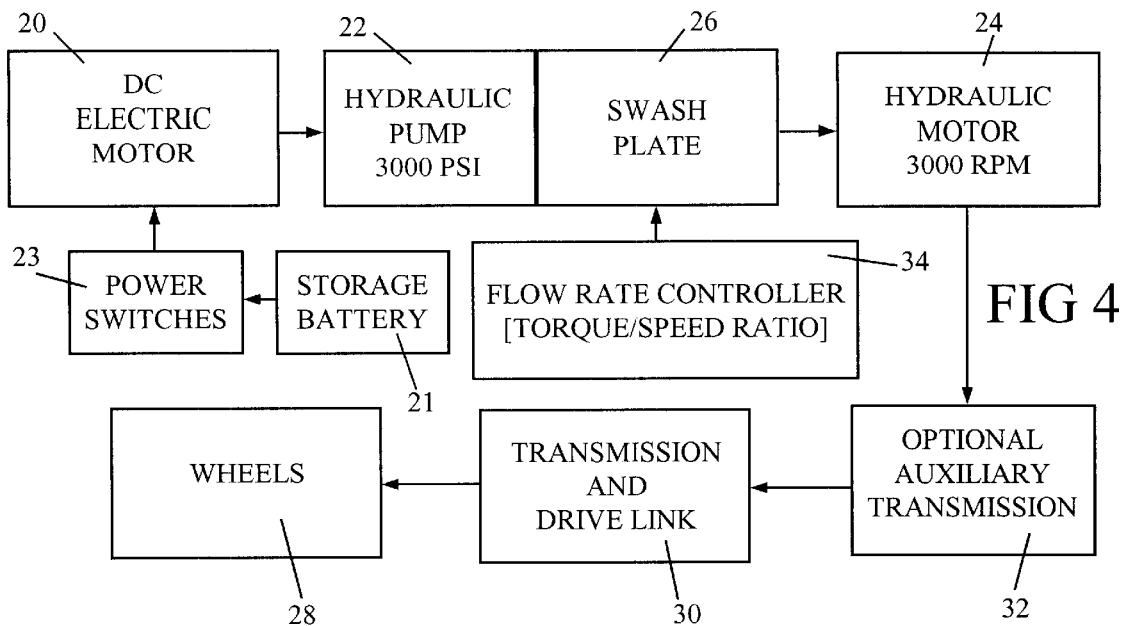
FIG. 4 is a block diagram illustrating the principal elements of a preferred embodiment of the present invention.

The power drive train of the present invention is illustrated in FIG. 4. The invention is preferably embodied in an otherwise conventional or prior art electric lift truck, which utilizes a DC electric motor of the type which has previously been used in electric lift trucks, as well as a bank of storage batteries, a transmission and drive link and wheels of the type used in the prior art. The invention differs from the prior art by the interposition in the drive train of a hydraulic system, as described below, along with the use of simple electric power switches for applying a constant battery voltage to the DC electric motor rather than varying that voltage.

Referring in more detail to FIG. 4, the rotating shaft of the DC electric motor 20 is drivingly connected to a displacement hydraulic pump 22, having a pressure output capacity of at least substantially 3,000 psi. The pump 22 is hydraulically connected to a rotary hydraulic motor 24 by suitable, conventional hydraulic conduits, such as hoses, pipes and manifold passages. The hydraulic system of the present invention also includes a hydraulic fluid volumetric flow rate control, connected in the hydraulic circuit for varying the torque and speed of a hydraulic motor 24. This is preferably accomplished by selecting a hydraulic pump 22, which has a swash plate arrangement 26 for controllably varying the displacement of pistons within the hydraulic pump 22 and thereby forming a variable displacement hydraulic pump. The DC motor 20 is powered by at least one storage battery 21, the voltage of which is applied through controlling power switches 23.

The hydraulic motor 24 is a displacement hydraulic motor, connected in the hydraulic circuit to receive hydraulic fluid under pressure from the pump 22 and having a rotational speed capacity of at least substantially 3,000 rpm.

The rotating output shaft of the hydraulic motor 24 is drivingly linked to the drive wheels 28 of the lift truck 10 through a mechanical transmission and other prior art drive link elements 30 for transmitting rotation of the hydraulic motor to rotation of the wheels at a desired torque and speed ratio.

In order to permit use of standard, prior art, commercially available mechanical transmissions, it is desirable to use an optional auxiliary transmission 32 in the form of a belt and pulley drive. However, the belt and pulley drive are used simply to modify the torque/speed ratio of the drive train between the motor and the wheels. The auxiliary belt and pulley drive may be omitted if a transmission is selected of an appropriate transmission ratio.

A flow rate controller 34 is connected to the swash plate 26 for varying the swash plate angle and thereby varies the pump displacement per revolution. The controller 34 permits the operator of the lift truck to controllably vary the torque/speed ratio between the hydraulic pump 22 and hydraulic motor 24 of the hydraulic circuit. Because each of the components illustrated in FIG. 4 is individually a prior art, commercially available component, it is not illustrated in more detail. However, preferred specifications for them will be described. of course, persons skilled in the art will recognize that there currently exist a variety of alternative, specific component hardware devices which can be substituted for the preferred hardware and there are likely to be additional designs in the future which can be used.

As also known to those skilled in the art, there are speed, torque and horsepower requirements for propelling any vehicle at an acceptable speed in all conditions the vehicle is expected to encounter and for providing sufficient torque in all conditions the vehicle will encounter. I have discovered by trial and error experimentation that the hydraulic pump of the present invention must be capable of operating at an output pressure of at least 3,000 psi and that the hydraulic motor be capable of operating at a rotational speed of at least 3,000 rpm in order to be able to construct a lift truck which is capable of providing sufficient torque for climbing grades ordinarily encountered by lift trucks and to provide that torque at a commercially acceptable vehicle travel speed on the grade, while at the same time providing a sufficient and commercially acceptable travel speed on a horizontal surface. At operating pressures and rotational speeds below those minimum values, lift trucks can be constructed and operated, but they will be unable to climb a continuous, extensive grade without losing speed, or they will be unable to climb the grade at an acceptable speed, or they will not be able to travel on a horizontal surface at an acceptable speed, any of which makes such a lift truck impractical and lacking in sufficient utility for use in their intended purpose.

For example, although a pump operating at a lower pressure can be obtained and used, and can provide sufficient speed of lift truck travel, the lift truck will not have sufficient gradeability, that is it will not be able to climb continuously at a constant speed indefinitely up grades of the type normally encountered. A 4% grade is the most commonly encountered grade and grades may extend up to approximately 7%. Prior art DC motor driven lift trucks can climb such grades, but can only do so unloaded and they stop climbing when their initial momentum is consumed. A lift truck embodying the present invention can climb such grades fully loaded and can stop and restart on the grade. Lift trucks embodying the invention were designed to be capable of operating at a 19% grade.

Hydraulic motors which are incapable of operating at 3,000 rpm can be used, but they will not be capable of providing a speed sufficient to give a commercially acceptable lift truck. Experimentation indicates that pumps and motors having a capacity even only 10% lower than those described above give unacceptable results, in that they either will not climb a grade, or, if capable of climbing the grade, will do so at an unacceptably slow speed. For example, if a hydraulic motor having a lower speed capacity is used, a drive train may be designed using conventional principles to provide a lift truck capable of climbing a grade at, for example, 1 mph on the grade, but such a lift truck would only be capable of travelling, for example, 1.5 to 2 mph on a horizontal surface. A lift truck embodying the present invention is capable of climbing a grade at an acceptable speed of at least 2 mph and, when on a horizontal surface, travel at a speed of 7–13 mph.

Figure 5:
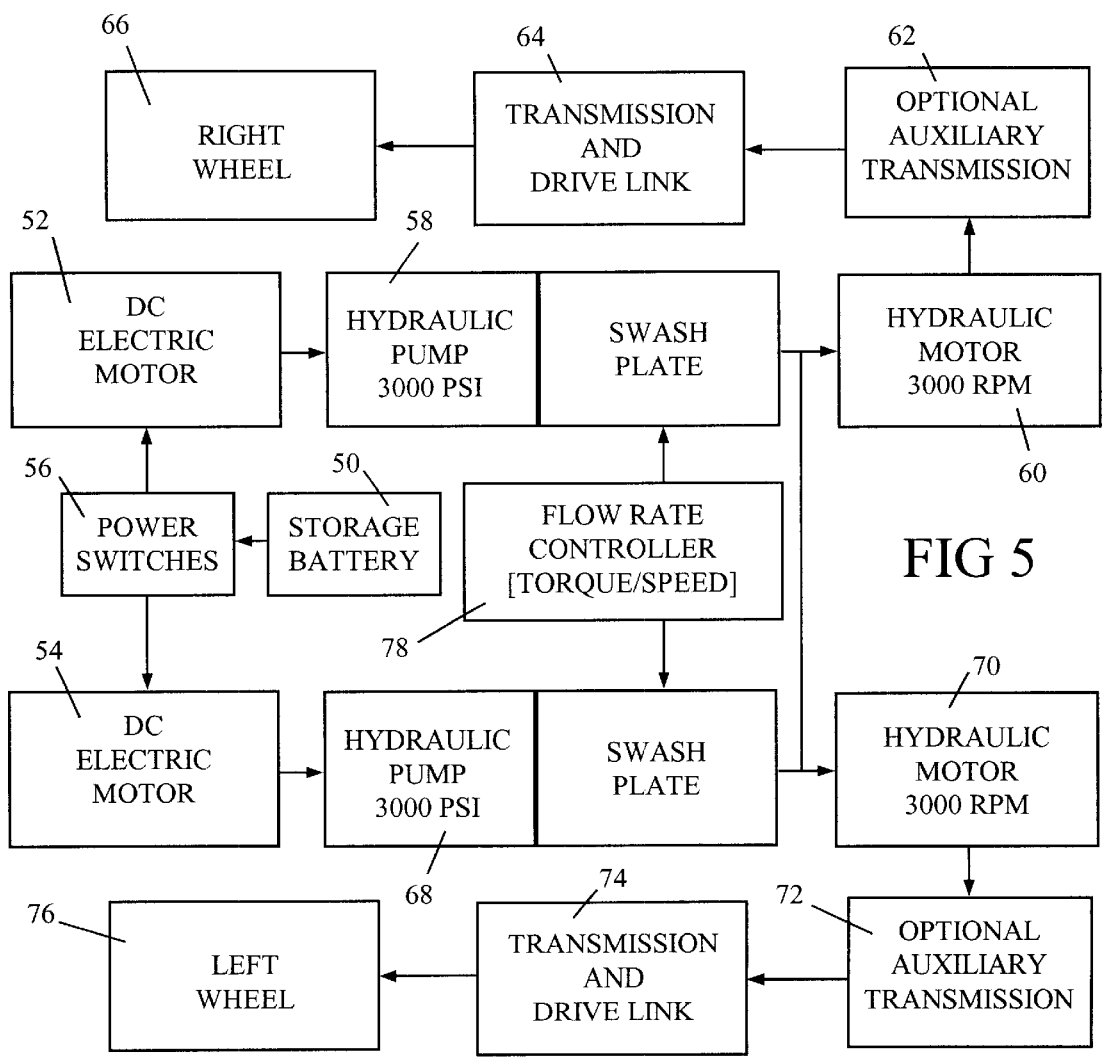
FIG. 5 is a block diagram illustrating the most preferred embodiment of the invention.

The most preferred embodiment of the invention comprises a pair of parallel connected and parallel operating power drive trains, each drive train applying motive power to a drive wheel on a different one of the opposite sides of the lift truck. However, the two hydraulic circuits are connected together to maintain pressure equilibrium and each is controlled by a common, driver operated control. Referring to FIG. 5, the bank of storage batteries 50 is connected to a first DC motor 52 and a second DC motor 54 through power switches 56. Similarly, to the embodiment of FIG. 4, a DC electric motor 52 is connected in a power drive train which includes a first hydraulic pump 58, a hydraulic motor 60, an optional transmission 62, and a conventional transmission and drive link 64 to the right wheel 66. Similarly, the second DC electric motor 54 is connected in a power drive train which includes a second hydraulic pump 68, a second hydraulic motor 70, an optional auxiliary transmission 72, a conventional transmission and drive link 74 and ultimately to the left wheel 76. Both swash plates of the hydraulic pumps 58 and 68 are controlled by a common flow rate controller 78.

Turning now to the preferred characteristics, parameters and specifications for the components of the preferred embodiment illustrated in FIG. 5, one important reason for the preference for parallel drive trains, each applying drive power to one drive wheel, is the commercial unavailability of DC motors which are specifically designed to drive hydraulic pumps and yet have sufficient horsepower for operating the lift truck in the manner of the present invention. Although DC motors of sufficient horsepower are available, they are not designed to drive hydraulic pumps and therefore are more costly. The preferred embodiment of FIG. 5 uses two DC motors, each having a 20 HP capacity. Although a 40 HP electric motor could be used in an embodiment of the form illustrated in FIG. 4, the flow rate capacity of the hydraulic pump and the hydraulic motor would need to be increased over that necessary for those components in the embodiment in FIG. 5 and it would not be as cost effective in view of the currently available motors.

Inversely, for lift trucks having approximately an 8000 pound capacity or below, a five horsepower DC motor may be used. Another alternative is that AC motors may be used The prior art shows battery powered lift truck with an inverter converting the DC battery voltage to an AC source to power an AC motor and that arrangement is also applicable to embodiments of the present invention.

The hydraulic pumps are preferably of the variable displacement type and most preferably are the type operated by swash plates. It will be apparent to those skilled in the art that other conventionally available hydraulic circuit elements may be interposed in the hydraulic circuit between the hydraulic pumps and the hydraulic motors for controllably varying the flow rate from each hydraulic pump to its associated hydraulic motor.

The pump used in the preferred embodiment is identified as M46-S Series 40, 2.8Cir, 17deg Max Angle, 0.85cir charge pump manufactured by Sauer Danfoss Company. This pump is manufactured to be mounted directly to the electric motor as a coupled unit and is always driven in the same direction of rotation by the electric motor. This preferred pump is a bidirectional flow pump with the flow direction through the pump controlled through selection of the swash plate angle by the flow rate controller. This permits the operator to select forward and reverse operation of the lift truck. A commercially available pump microcontroller can be purchased along with a conventional control pedal, which includes a potentiometer for sensing pedal pivot angle so that the operator tilts the pedal forward from a neutral position for forward movement at an angle which is proportional to the desired speed, and similarly tilts the pedal backward from its neutral position for reverse travel in a toe and heel operation.

The flow rate controller, such as flow rate controller 34 or flow rate controller 78 in FIGS. 4 and 5 respectively, are of the type which are commercially available and may be hydraulic, electronic, mechanical or a combination. Because various types of such controllers are commercially available, the controller is not described in detail. For example, the preferred embodiment utilizes an SX microcontroller, manufactured by Sauer Danfoss Company.

The preferred hydraulic motor is identified as M46-S Series 40, 2.8cir, 17deg Max Angle, axial motor, manufactured by Sauer Danfoss Company. It is a multi-speed motor, in particular a two speed hydraulic motor in order to permit selection from two torque and speed ratios. This permits each hydraulic motor to run at half displacement under low speed/high torque demand on the drive system. The hydraulic motors are also two direction motors to permit forward and reverse travel of the lift truck.

The optional auxiliary transmissions 32, 62 and 72 are belt and pulley drives, which slightly modify the drive ratio to accommodate commercially available transmissions 30, 64 and 74. Those skilled in the art are familiar with the calculation and design of drive ratios, which must take into account a variety of factors, such as loaded vehicle weight, wheel size, torque requirements and vehicle speed requirements. Lift trucks embodying the present invention may be designed over broad ranges of these and other design requirements and characteristics. The preferred transmission is an HFK 300 model, which has 10 or 12 selectable but fixed transmission ratios available, those ratios being in the range from 10:1 to 27.6:1. The optional auxiliary transmissions permit slight variation of these transmission ratios. For example, the preferred ratio of the optional auxiliary transmissions is in the range of 1:1.75 to 1:2 for most lift truck designs. Of course, some designs will require no optional auxiliary transmission and the optional auxiliary transmission may also be unnecessary with different transmission models of other manufacturers or of custom designed.

Figure 6:
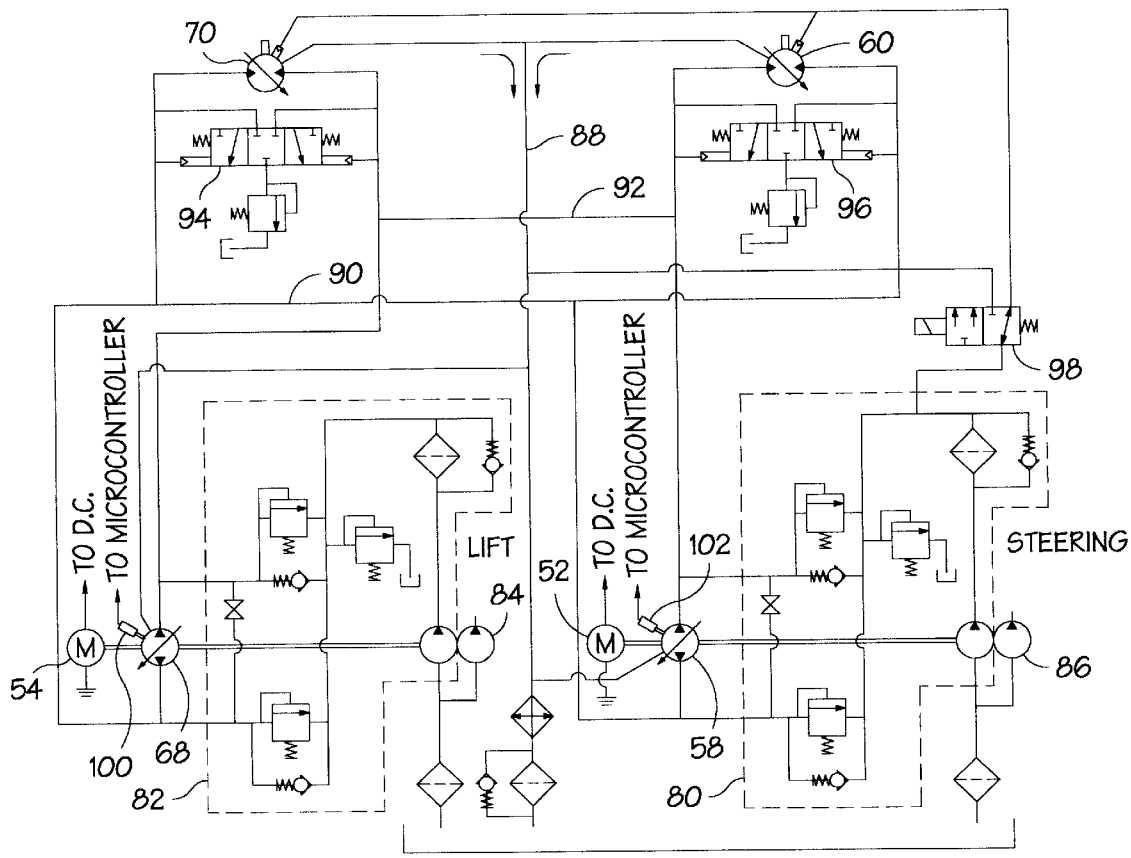
FIG. 6 is a schematic diagram of the hydraulic circuit of the most preferred embodiment of the invention.
Figure 2:
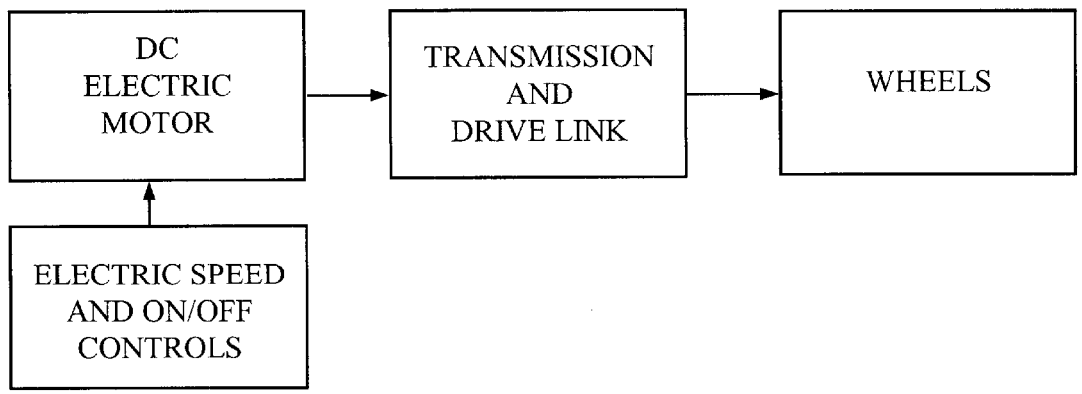
FIG. 2 is a block diagram illustrating a prior art DC electric motor driven lift truck drive train.
Figure 3:
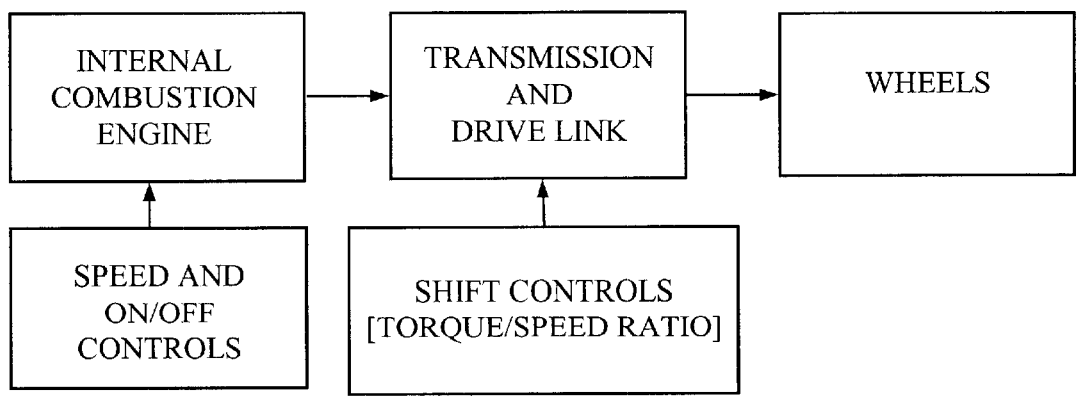
FIG. 3 is a block diagram illustrating a prior art internal combustion engine driven drive train.

FIG. 6 illustrates the preferred hydraulic circuit of the present invention. The electric motors 52 and 54 are connected to the variable displacement hydraulic pumps 58 and 68 respectively. These pumps are connected to hydraulic motors 60 and 70 respectively. Each pump is provided with a conventional anticavitation charge pump hydraulic circuit 80 and 82 respectively, the purpose of which is to keep the main pumps 58 and 68 primed. Additionally, a hydraulic pump 84 is mounted to the shaft of electric motor 54 for providing hydraulic pressure for operating the hydraulic system of the lift and a hydraulic pump 86 is connected to the shaft of electric motor 52 to provide hydraulic pressure for the conventional hydraulic steering system.

Hydraulic motors 60 and 70 each have two, high pressure inlet ports, one for each direction of rotation. Their outlet ports are connected to a common return line 88. The high pressure inlet ports of the motors 60 and 70 are connected together by interconnections 90 and 92 so that their pressures are equalized and they operate in parallel. This interconnection prevents the drive wheels from having an affect upon steering and eliminates the need for a differential because the pressure equalization equalizes the torque on the driven wheels and the outer wheel rotates at a higher speed during a turn.

Valves 94 and 96 are pressure operated with a spring return and operate to block the inlet port to which pressure is applied to prevent its connection to tank, while connecting to tank the inlet port to which pressure is not applied. Pressure is applied to one inlet port of each motor for forward travel and to the opposite inlet port for reverse travel.

Solenoid operated valve 98 is connected to the high-low speed control input ports of the hydraulic motors 60 and 70 for controllably selecting either of the two motor speeds. The swash plate control inputs 100 and 102 are connected to the microcontroller flow rate controller 78 (not shown in FIG. 6).

The operational advantages of the combination of the present invention results from the interplay of a DC motor which is continuously operated at full rpm, the high pressure requirement of the hydraulic pump and the high rpm requirement of the hydraulic motor. With a conventional DC motor driven lift truck, when encountering a grade the DC motor of the conventional DC motor driven lift truck becomes overloaded and slows down. The electrical current through a DC motor increases as the motor loading increases and the motor slows its rotational velocity. In addition to increased electrical current, the slower angular rotation rate also decreases heat transfer by the cooling air circulated through the motor. As a result, in conventional systems the DC motor of the lift truck becomes substantially overheated as the lift truck encounters a grade. With the present invention, the motor continuously operates at or near full speed, except for some relatively small speed reduction resulting from increased torque loading. Therefore, the electric motor remains cooler and is more efficient, consuming less electrical power because a smaller proportion of electrical power is dissipated as heat. Additionally, the high minimum pressure of the present invention and the extensive drive ratio range provided by the swash plate system provide sufficient torque to enable the lift truck to climb a grade. Under a high speed demand condition, the drive ratio range provided by the swash plate operation can be high enough to give high speed as a result of the use of a hydraulic motor having the 3,000 rpm minimum specification, so that the lift truck can travel at a useable, practical speed.

While certain preferred embodiments of the present invention have been disclosed in detail, it is to be understood that various modifications may be adopted without departing from the spirit of the invention or scope of the following claims.

What is claimed is:

1. A lift truck having a power train drivingly linked to drive wheels of the lift truck, the power train including:
   (a) an electric motor;
   (b) a displacement hydraulic pump drivingly linked to the electric motor and having a pressure output capacity of at least substantially 3000 psi;
   (c) a displacement hydraulic motor connected by hydraulic conduit to receive hydraulic fluid from the pump and having a rotational speed capacity of at least substantially 3000 rpm, the pump, hydraulic motor and conduit forming a hydraulic circuit; and
   (d) a hydraulic fluid volumetric flow rate control connected in the hydraulic circuit for controllably varying the hydraulic motor torque and speed.

2. A lift truck in accordance with claim 1 wherein the hydraulic motor is drivingly linked to the drive wheels through a mechanical transmission and drive link for transmitting rotation of the hydraulic motor to the wheels.

3. A lift truck in accordance with claim 1 wherein the hydraulic pump and the control are formed by a variable displacement hydraulic pump.

4. A lift truck in accordance with claim 3 wherein the variable displacement pump has a plurality of pistons slidable in cylinders and a swash plate for controllably varying the displacement of the pistons.

5. A lift truck in accordance with claim 1 or claim 2 or claim 3 or claim 4 wherein the electric motor is a DC motor powered by storage batteries.

6. A lift truck in accordance with claim 1 or claim 2 or claim 3 or claim 4 wherein the pump is a bidirectional flow pump for selecting forward and reverse operation of the lift truck.

7. A lift truck in accordance with claim 1 or claim 2 or claim 3 or claim 4 wherein the hydraulic motor is a multi-speed hydraulic motor for selecting from multiple torque and speed ratios.

8. A lift truck in accordance with claim 7 wherein the hydraulic motor is a two speed motor.

9. A lift truck in accordance with claim 1 and further comprising:
   (a) a second electric motor;
   (b) a second displacement hydraulic pump drivingly linked to the second electric motor and having a pressure output capacity of at least substantially 3000 psi; and
   (c) a second displacement hydraulic motor connected by hydraulic conduit to receive hydraulic fluid from the second pump and having a rotational speed capacity of at least substantially 3000 rpm, the second pump, second hydraulic motor and conduit forming a hydraulic circuit.

10. A lift truck in accordance with claim 9 wherein each hydraulic motor is drivingly linked to a drive wheel on a different side of the lift truck through a different mechanical transmission and different drive link for transmitting rotation of each hydraulic motor to the wheel to which each motor is linked; wherein each hydraulic motor is a two speed motor; wherein each pump is a bidirectional flow pump for selecting forward and reverse operation of the lift truck; wherein each electric motor is a DC motor powered by storage batteries; wherein, each hydraulic pump and each control are formed by a variable displacement hydraulic pump; wherein each variable displacement pump has a plurality of pistons slidable in cylinders and a swash plate for controllably varying the displacement of the pistons.

11. A method for propelling a lift truck having a battery driven electric motor, the method comprising:
   (a) driving a hydraulic pump at a hydraulic fluid pressure of at least 3000 psi with the electric motor;
   (b) driving a hydraulic motor at a rotational speed of at least 3000 rpm by applying hydraulic fluid from the pump to the hydraulic motor, the hydraulic motor being drivingly connected in a drive train connected to at least one wheel of the lift truck; and
   (c) varying the hydraulic fluid flow rate through the hydraulic motor to controllably vary the torque and speed ratio of the drive train.

12. A method in accordance with claim 11 and further comprising continuously applying a substantially constant drive voltage to the armature of the electric motor while performing said driving steps.

* * * * *